Sept. 25, 1923.

F. L. MacALEESE

PUNCH

Filed May 13, 1921

INVENTOR.
Frederic L. MacAleese
BY
Erwin, Wheeler & Woolard,
ATTORNEYS.

Sept. 25, 1923.  F. L. MacALEESE  1,469,093
PUNCH
Filed May 13, 1921   2 Sheets-Sheet 2

INVENTOR.
Frederic L. MacAleese
BY
Erwin, Wheeler & Woolard,
ATTORNEYS.

Patented Sept. 25, 1923.

1,469,093

UNITED STATES PATENT OFFICE.

FREDERIC L. MacALEESE, OF MILWAUKEE, WISCONSIN.

PUNCH.

Application filed May 13, 1921. Serial No. 469,093.

*To all whom it may concern:*

Be it known that I, FREDERIC L. MAC-ALEESE, a citizen of the United States, residing at Milwaukee, county of Milwaukee, and State of Wisconsin, have invented new and useful Improvements in Punches, of which the following is a specification.

This invention relates to punches and is particularly directed to power driven punches.

Objects of this invention are to provide a power driven punch which will automatically punch a series of holes in a sheet of material, such for example, as a flat rubber mat; to provide such a machine which is rapid in its operation; which is automatic; which will automatically retract and advance itself continuously across such sheet of material; and which will not distort the material.

Further objects are to provide a power driven punch which may be readily manipulated; to provide such a machine arranged to retain the mat in flat condition; and to so organize the machine that a series of regularly spaced punch holes will be formed in the mat.

Further objects are to provide a power driven punch in which a continuously travelling carriage is provided thereby avoiding inertia effects and jars due to sudden starting and stopping; to provide such an apparatus in which the punch is temporarily and intermittently retained relatively still as against longitudinal motion; and in which the punch is retained in elevated position while the carriage is being retracted.

Further objects are to provide a simple machine having the above noted characteristics and one which may be readily and cheaply manufactured.

An embodiment of the invention is shown in the accompanying drawing, in which.

Figure 1:
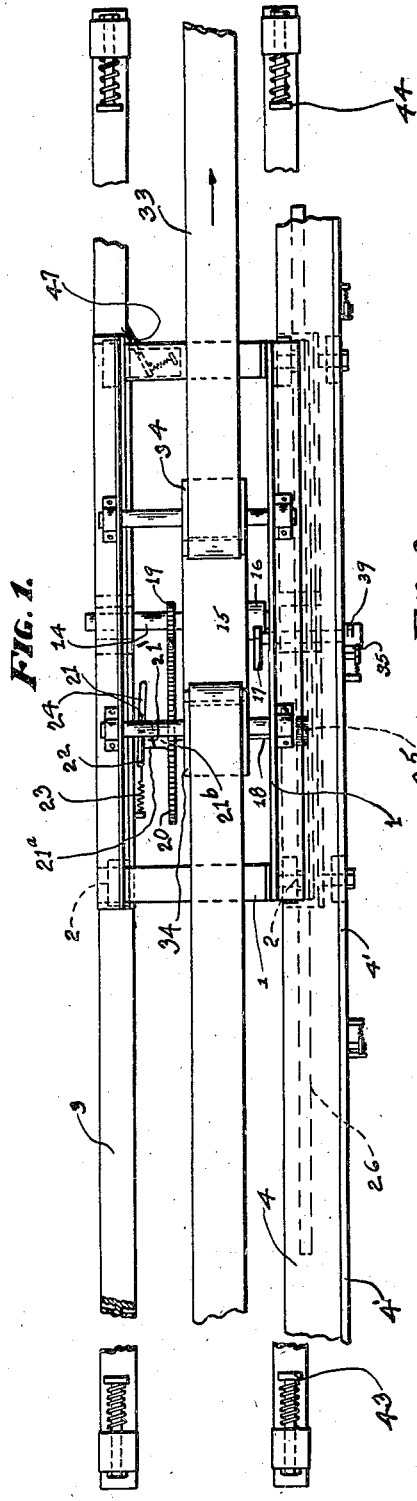
Fig. 1 is a fragmentary plan view of the machine.
Figure 2:
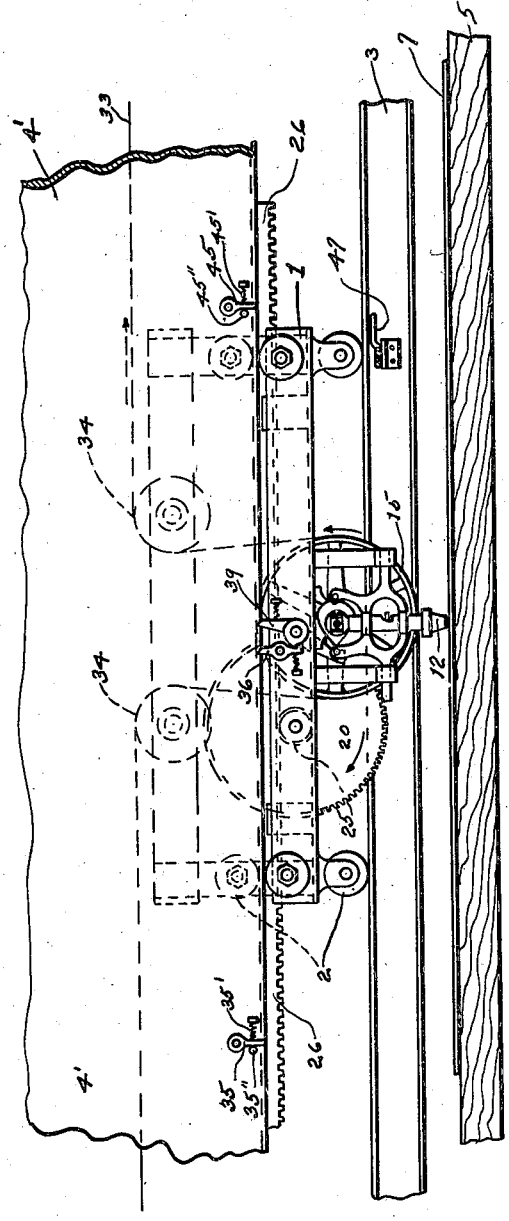
Fig. 2 is a fragmentary side elevation of the structure shown in Figure 1.

The machine comprises a main carriage 1 which is supported by means of rollers 2 upon a pair of stationary tracks 3 and 4. Below the tracks and carriage a punching table or support 5 is mounted for lateral motion upon a base or support 6. This support 5 is adapted to have the mat 7 placed thereon, in extended position. A hand crank 8, having an extended portion 9 threadably engaging a nut or similar portion 10 formed upon the base member 6, is adapted to impart this transverse motion to the supporting table 5 after each operative travel of the carriage outwardly above the mat. A punch 11, having a cutting head 12, is carried by an auxiliary carriage 13. This auxiliary carriage is movably supported from the main carriage and is adapted to have oscillatory motion relatively to said main carriage.

The main carriage is provided with a transverse driving shaft 14 which has loosely mounted thereon, a driving pulley 15. A trigger clutch 16 serves to connect and disconnect the driving wheel or fly wheel 15 from the shaft 14, such trigger clutch being controlled by the control lever 17, whose operation will be described in detail later. A second transverse shaft 18 is mounted parallel to the shaft 14 and is adapted to receive motion from such shaft 14 thru the medium of the reducing gears 19 and 20. An over-running clutch 21' serves to couple the otherwise loosely mounted gear 20 to the shaft 18, such clutch being under the control of the spring-held lever 21. This lever, it will be noted, is pivoted at 22 and is connected with the spring 23 at the point 24 so that when the line of the spring falls upon either of the two sides of the pivot point 22, such spring will serve to retain the lever 21 in either of the respective positions. The shaft 18 carries at its outer end a pinion 25 which meshes with a rack 26 mounted upon the under side of the track 4.

The shaft 14 extends outwardly beyond the outlines of the main carriage 1 and carries at its extended end an eccentric pin 27 which works in a slide block 28. The upper end of the punch 11 is provided with a rectangular slot 29 within which such block 28 works, whereby vertical reciprocatory motion will be imparted to the punch. The extended portion of the shaft 14 also carries a cam 30, which works between rollers 31, supported by arms 32 from the auxiliary carriage 13. It will be seen that when the shaft 14 is rotated, the carriage 13 is given oscillatory motion relative to the main carriage and the punch is given an up and down reciprocatory motion. The relation of the cam 30 and pin 27 is such that the punch will make a downward or working stroke when the auxiliary carriage 13 is moving rearwardly and when the punch has been withdrawn from the mat 7, the auxiliary carriage 13 will be given a forward motion by the cam 30.

Figure 4:
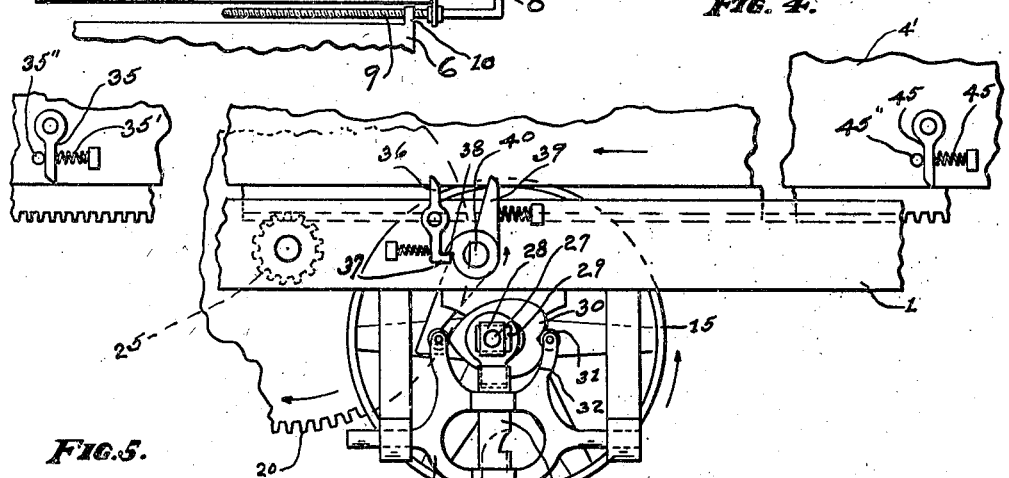
Fig. 4 is a view on an enlarged scale of a portion of the apparatus, such view corresponding to the central part of Figure 2.

As thus far described, it will be seen that as the driving pulley or fly wheel 15 is rotated in the direction of the arrow (Figure 4) the carriage will be advanced, as indicated in the figure, continuously along the tracks. At the same time cam 30 will oscillate the auxiliary carriage in such a manner that the rearward motion of the auxiliary carriage exactly neutralizes the forward travel of the main carriage, so that the auxiliary carriage temporarily and intermittently will remain relatively stationary to the mat 7. While such auxiliary carriage remains stationary, the punch 11 makes a working stroke and withdraws from the mat 7. When such punch has been withdrawn from the mat the auxiliary carriage is then given its forward motion and correspondingly moves the punch to its necessary position ready for its working stroke.

Figure 3:
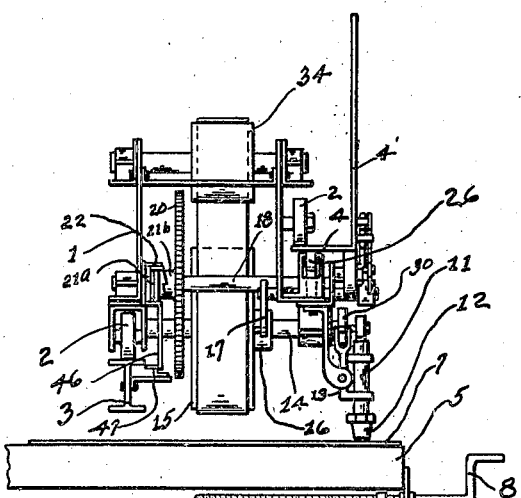
Fig. 3 is an end view of the structure shown in Figure 1.

The energy for operating the entire mechanism is supplied thru the medium of the belt 33 which travels in the direction indicated by the arrow in Figure 1. The belt passes over guide pulleys 34 (Figures 1 and 3) and downwardly and around the driving pulley 15.

When the traveling carriage has almost reached its outer limit of travel, a member 35, mounted upon the upturned portion 4' of the track 4, engages the trip 36 mounted upon the travel carriage 1. This trip 36 then withdraws its retaining finger 37 from engagement with the lug 38 of the spring-pressed arm 39 and allows such arm to rotate the control shaft 40 in the direction indicated by the arrow in Figure 4. When this shaft is rotated, the control arm 17 moves its retaining finger 41 into the path of travel of the pin 42, which is the connecting element of the trip clutch 16. This pin is, therefore, rotated against the action of its spring when it strikes the finger 41 and serves both to disconnect the fly wheel or pulley 15 from the shaft 14 and also to arrest the motion of the shaft 14. The relative positions of the crank pin 27 and of the pin 42 are such that the punch is retained in its upward or retracted position when this disconnecting of the driving pulley from the shaft occurs. The carriage will have acquired a certain amount of momentum which will have caused it to continue in its outward travel. During this time the advancing pinion 25 transmits motion to the shaft 18 and to the member 21$^a$ of the overrunning clutch 21'. Inasmuch as the shaft 14 is locked against motion, the movement of the member 21$^a$ will serve to disconnect it from the other member 21$^b$ of the over-running clutch. After this has occurred, the carriage travels a slight distance farther and strikes the resiliently positioned bumpers 43 which arrest the motion of the carriage.

The retraction of the carriage is due to the frictional drag of the belt 33 upon the pulleys 15 and 34. The carriage, therefore, travels backwardly to its initial position—the pinion 25 freely rotating the shaft 18, as the member 21$^a$ of the over-running clutch is now spring-held in its outward position, thereby maintaining the shaft operatively disconnected from the other portions of the mechanism.

Figure 5:
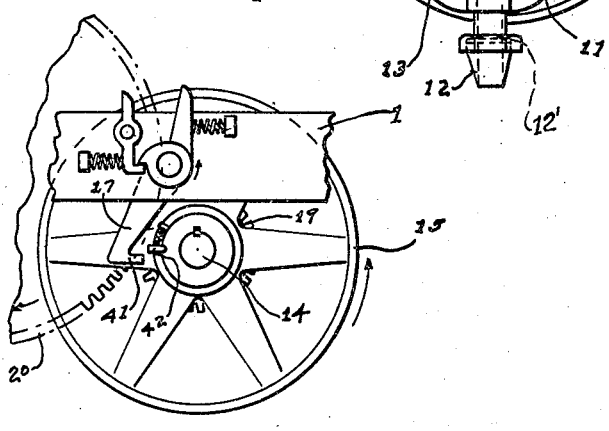
Figure 5 is a view of a portion of the apparatus shown in Figure 4 with parts removed for clearness.

The carriage, during its rearward travel, acquires considerable momentum and strikes the resiliently pressed bumpers 44 with sufficient force to cause the carriage to rebound or start on its outward travel. When this occurs, the pivotally mounted member 45 strikes first, the trip member 36 and thereafter, releases such trip member, then strikes the arm 39, and rotates such arm clockwise until the finger 37 of the trip member again engages beneath the lug 38, thereby locking the control rod 17 in its outward position, as indicated in Figure 5. When this occurs, the continued rotation of the pulley 15 allows the trigger clutch to again operatively connect the shaft 14 and the driving pulley 15 in a well known manner, and allows the pin 42 to be moved by its spring into the position indicated in Figure 5. A detailed description of the trigger clutch mechanism is not given, such mechanism is well known. It is to be noted that each of the pivotally mounted members 35 and 45 are resiliently pressed by springs 35' and 45' against pins 35'' and 45''. By having these members so arranged upon the stationary portion of the mechanism, that is to say, upon the upwardly extending portion 4' of the track 4, the arms 36 and 39 are permitted to move the members 35 and 45 against the action of other respective springs while the carriage is making its retractive movement. In order to again establish the operative connection between the gear 20 and the shaft 18, a rod 46, which extends downwardly from the free end of the lever 21, engages the spring-pressed diagonally arranged pivoted lever 47 which is associated with the track 3. When this rod engages the lever, it is moved inwardly towards the center of the carriage and moves the member 21$^a$ of the over-running clutch into operative engagement with the member 21$^b$ of such clutch, thereby re-establishing the driving connection between the fly wheel or drive pulley 15 and the driving pinion 25.

If desired, the punch may be provided with a rubber or other resilient gasket or washer 12' between the cutting head and the stem of the punch or in any suitable position to take up the shock due to the punching operation, particularly that due to the striking of the punch cutting head against the table. It is of course understood that the table is adjustable vertically with respect to the punch either by adjusting the punch mechanism or by adjusting the table. However, in case the adjustment should not be quite right, the resilient gasket will take up the shock that would otherwise be imposed upon the punch. It is to be noted that the relatively heavy portions of the punch continuously travel outwardly, during the working outward motion of the mechanism, and that a very light auxiliary carriage and a very light punch 11 are given intermittent oscillatory motion. By this means the momentum effects are not encountered when the punch proper 11 remains in one fixed position with regard to longitudinal motion. It will also be seen that the punch proper is retained in its elevated position during the entire retracted motion of the main carriage.

It will thus be seen that an automatic power driven punch has been provided which will punch a series of holes across a mat, automatically retract itself, and again start on its outward working travel. During this retracted motion of the punch, it is merely necessary for the operator to rotate the hand crank 8 a certain amount to position the mat properly for a successive row of perforations. In this manner, a succession of punched rows of perforations may be rapidly formed without subjecting the mat to distortion and without subjecting the mechanism of the punching apparatus to excessive strains, due to sudden starting and stopping.

I claim:

1. A traveling punch for punching a series of perforations in a sheet of material, comprising a carriage adapted to travel continuously across said sheet, an auxiliary carriage carried thereby, a punch reciprocated within said auxiliary carriage, and means for reciprocating said auxiliary carriage, whereby said punch may be intermittently free from longitudinal motion.

2. A punch comprising a continuously traveling carriage, an auxiliary carriage carried thereby, means for oscillating said auxiliary carriage to cause said auxiliary carriage to temporarily remain motionless at successive intervals and to rapidly advance between said intervals, and a reciprocatory punch supported by said auxiliary carriage.

3. A machine for punching a series of holes in a sheet of material, comprising a track, a carriage adapted to travel along said track across said sheet of material, and a punch mounted in said carriage having relative longitudinal and vertical motion with respect to said carriage, whereby, when said punch is descending, it is temporarily free from longitudinal motion with respect to said sheet.

4. A machine for punching a series of holes in a sheet of material, comprising a track, a carriage adapted to advance continuously along said track, a reciprocatory punch carried by said carriage, and mechanism associating said track, carriage and punch, to cause said punch to temporarily cease traveling longitudinally and to make a punching stroke at intervals.

5. A machine for punching a series of holes in a sheet of material, comprising a main carriage adapted to travel back and forth across said sheet of material, an auxiliary carriage carried by said main carriage, a reciprocatory punch mounted on said auxiliary carriage, means for oscillating said auxiliary carriage in the direction of travel of said main carriage to permit said punch to make a working stroke while said auxiliary carriage is temporarily motionless, and means for causing the cessation of the operation of said punch while said main carriage is being retracted.

6. A machine for punching a series of holes in a relatively stationary sheet of material, comprising a traveling carriage, means for automatically advancing said carriage continuously across said sheet and for retracting said carriage, a member carried by said carriage, mechanism for advancing and retracting said member with respect to said carriage whereby said member is temporarily and intermittently held stationary relative to said sheet, a reciprocatory punch associated with said member, and mechanism for operating said punch to cause a working stroke while said first mentioned member is relatively stationary.

7. A machine for punching a series of holes in a relatively stationary sheet of material, comprising a traveling carriage, means for automatically advancing said carriage continuously across said sheet and for retracting said carriage, a member carried by said carriage, mechanism for advancing and retracting said member with respect to said carriage whereby said member is temporarily and intermittently held stationary relative to said sheet, a reciprocatory punch associated with said member, and mechanism for operating said punch to cause a working stroke while said first mentioned member is relatively stationary, and a trip for operatively disconnecting said member and said punch from said carriage advancing means while said carriage is being retracted.

8. A machine for punching a series of holes in a relatively stationary sheet of material, comprising a traveling carriage, mechanism for automatically advancing said carriage continuously across said sheet and for retracting said carriage, a member carried by said carriage, mechanism for advancing and retracting said member with respect to said carriage whereby said member is temporarily and intermittently held stationary relative to said sheet, a reciprocatory punch associated with said member and mechanism for operating said punch to cause a working stroke while said first mentioned member is relatively stationary, and a trip for operatively disconnecting said member and said punch from said carriage advancing mechanism while said carriage is being retracted, said mechanism adapted to retain said punch in an elevated position while said carriage is being retracted.

9. A machine for punching a series of holes in a relatively stationary sheet of material, comprising a traveling carriage, means for automatically advancing said carriage continuously across said sheet and for retracting said carriage, a member carried by said carriage, mechanism for advancing and retracting said member with respect to said carriage whereby said member is temporarily and intermittently held stationary relative to said sheet, a reciprocatory punch associated with said member, and mechanism for operating said punch to cause a working stroke while said member is relatively stationary, means for initiating the retraction of said carriage when it has arrived at its limit of travel and for retaining said punch in elevated position during retraction of said carriage, and means for re-establishing the operative connection between said punch and said carriage advancing mechanism when said carriage has been retracted.

10. An automatic punch comprising a main traveling carriage, a shaft rotatably mounted within said carriage, a pulley on said shaft, a belt extending in the direction of travel of said main carriage and adapted to rotate said pulley, mechanism connected with said shaft for advancing said shaft continuously in one direction, an auxiliary carriage carried by said main carriage, mechanism for connecting said shaft and auxiliary carriage whereby said carriage temporarily and intermittently remains substantially stationary while said main carriage continuously advances, a reciprocatory punch carried in said auxiliary carriage, mechanism for imparting reciprocatory motion to said punch, and means for disconnecting said carriage advancing mechanism from said shaft and for disconnecting said pulley from said shaft whereby said carriage may be retracted by the traveling belt.

11. An automatic punch comprising a main carriage, a shaft rotatably mounted within said carriage, a pulley on said shaft, a belt extending in the direction of travel of said main carriage and adapted to rotate said pulley, mechanism connected with said shaft for advancing said main carriage continuously in one direction, an auxiliary carriage carried by said main carriage, mechanism for connecting said shaft and auxiliary carriage whereby said carriage temporarily and intermittently remains substantially stationary while said main carriage continuously advances, a reciprocatory punch carried in said auxiliary carriage, mechanism for imparting reciprocatory motion to said punch, mechanism for automatically disconnecting said shaft from said carriage advancing mechanism and for disconnecting said pulley from said shaft when said main carriage has completed its outward travel, and mechanism for re-establishing the interrupted connections when the carriage has been retracted, whereby said carriage will be continuously advanced by said carriage advancing mechanism in one direction and retracted by the traveling belt in the other direction.

FREDERIC L. MacALEESE.